Aug. 4, 1970
A. A. DI PILLA
3,523,169
TWO-POSITION TUBULAR LIGHTED PUSHBUTTON CONSTRUCTION
Filed Sept. 4, 1968
5 Sheets-Sheet 1
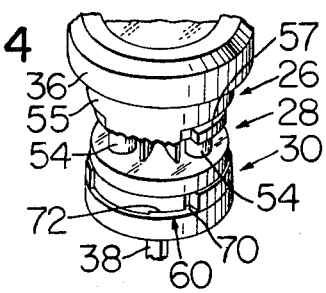
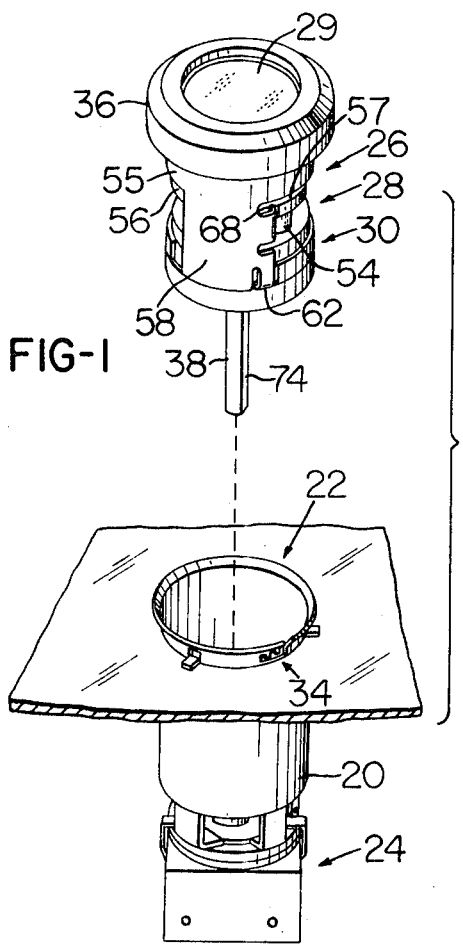
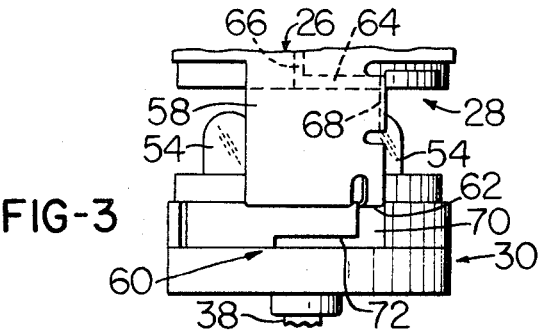
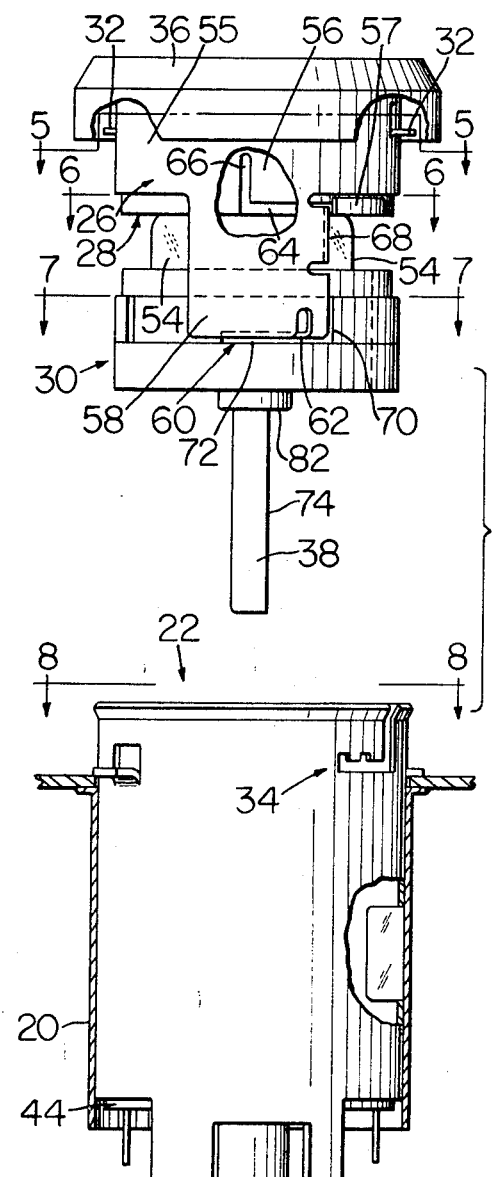
INVENTOR.
ANTHONY A. DiPILLA
BY
HIS ATTORNEYS

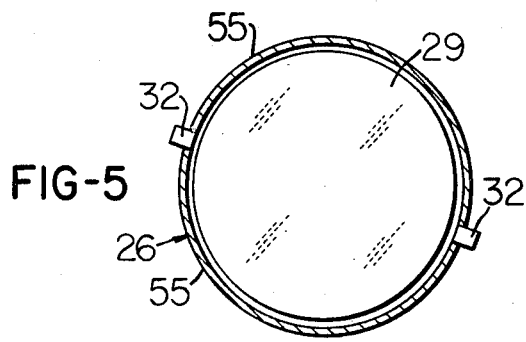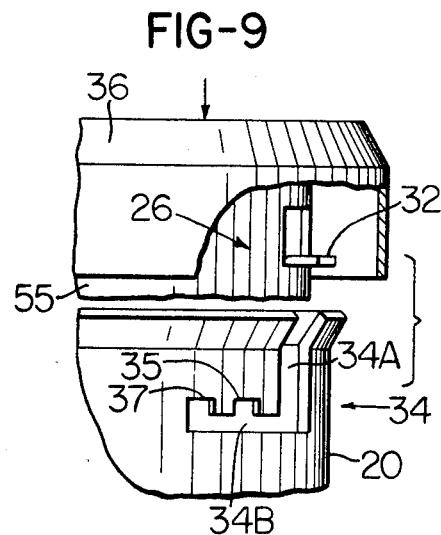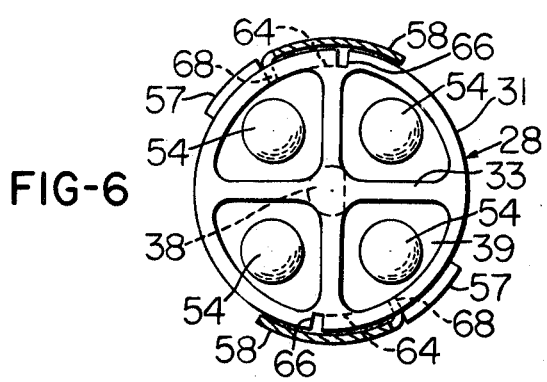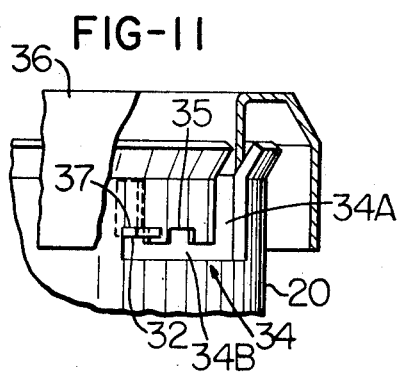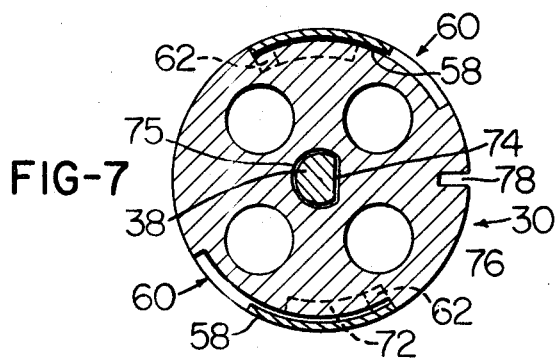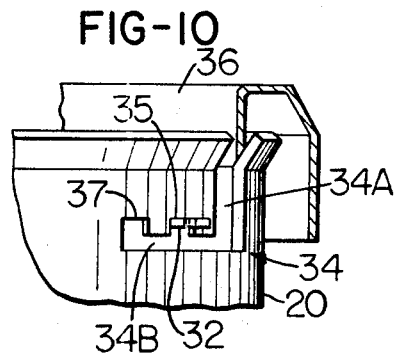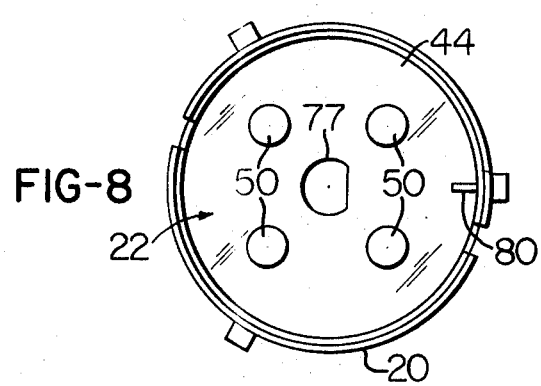
INVENTOR.
ANTHONY A. DiPILLA
HIS ATTORNEYS

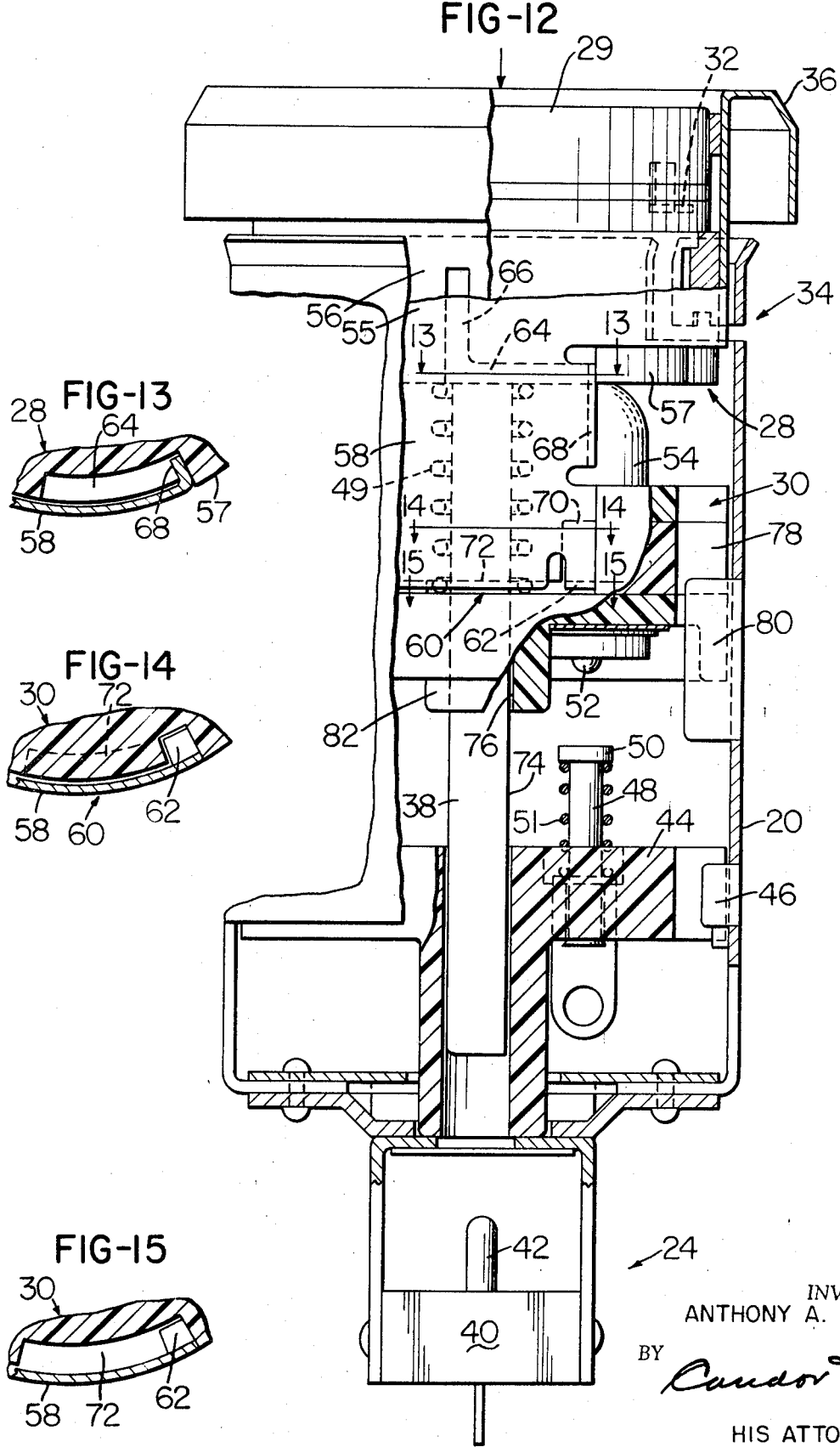

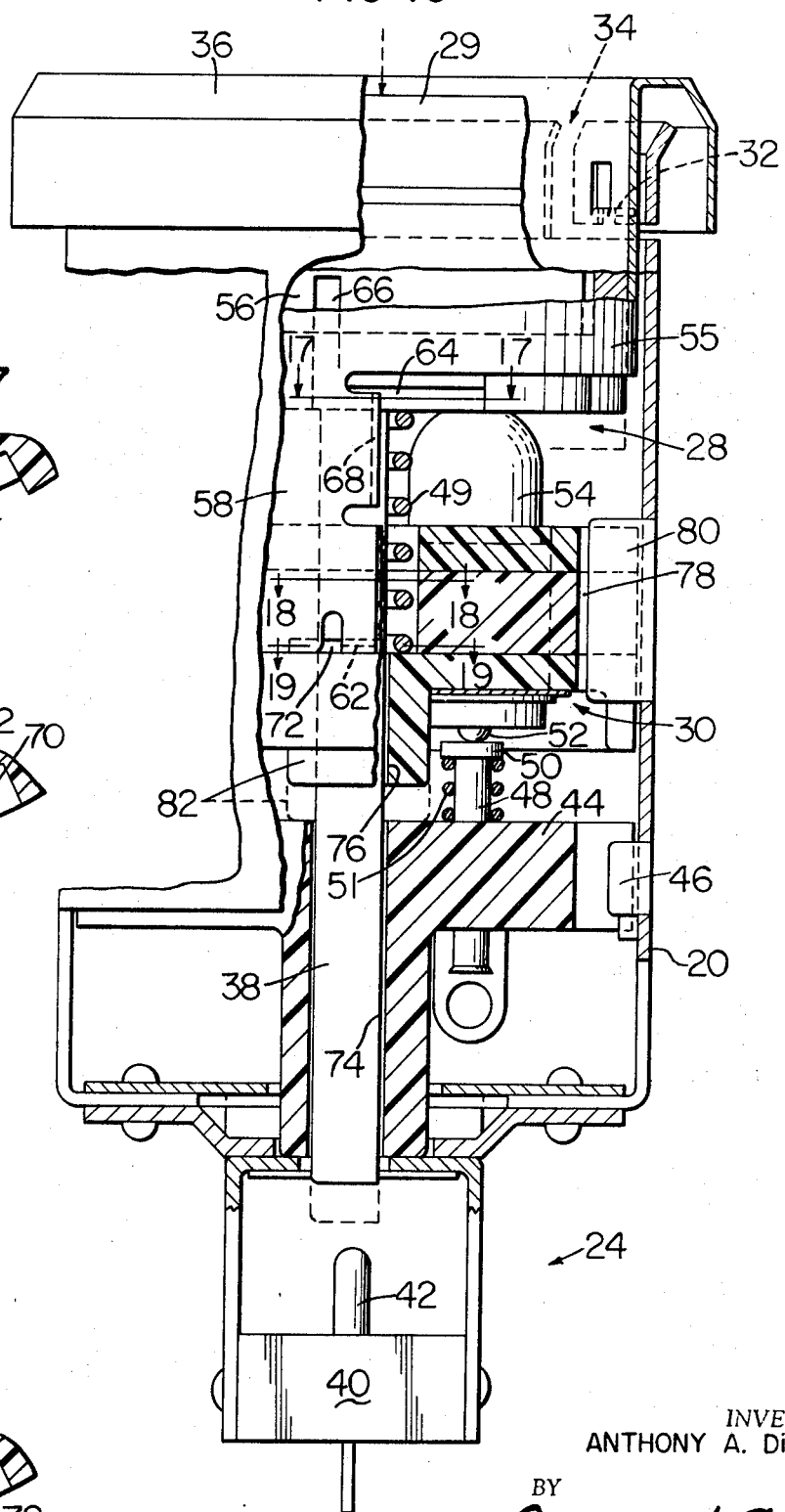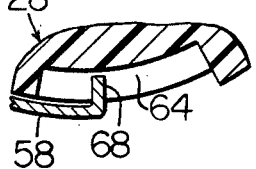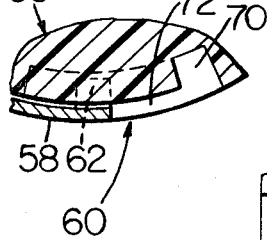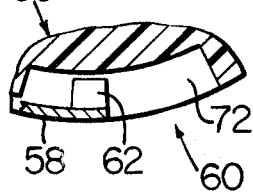

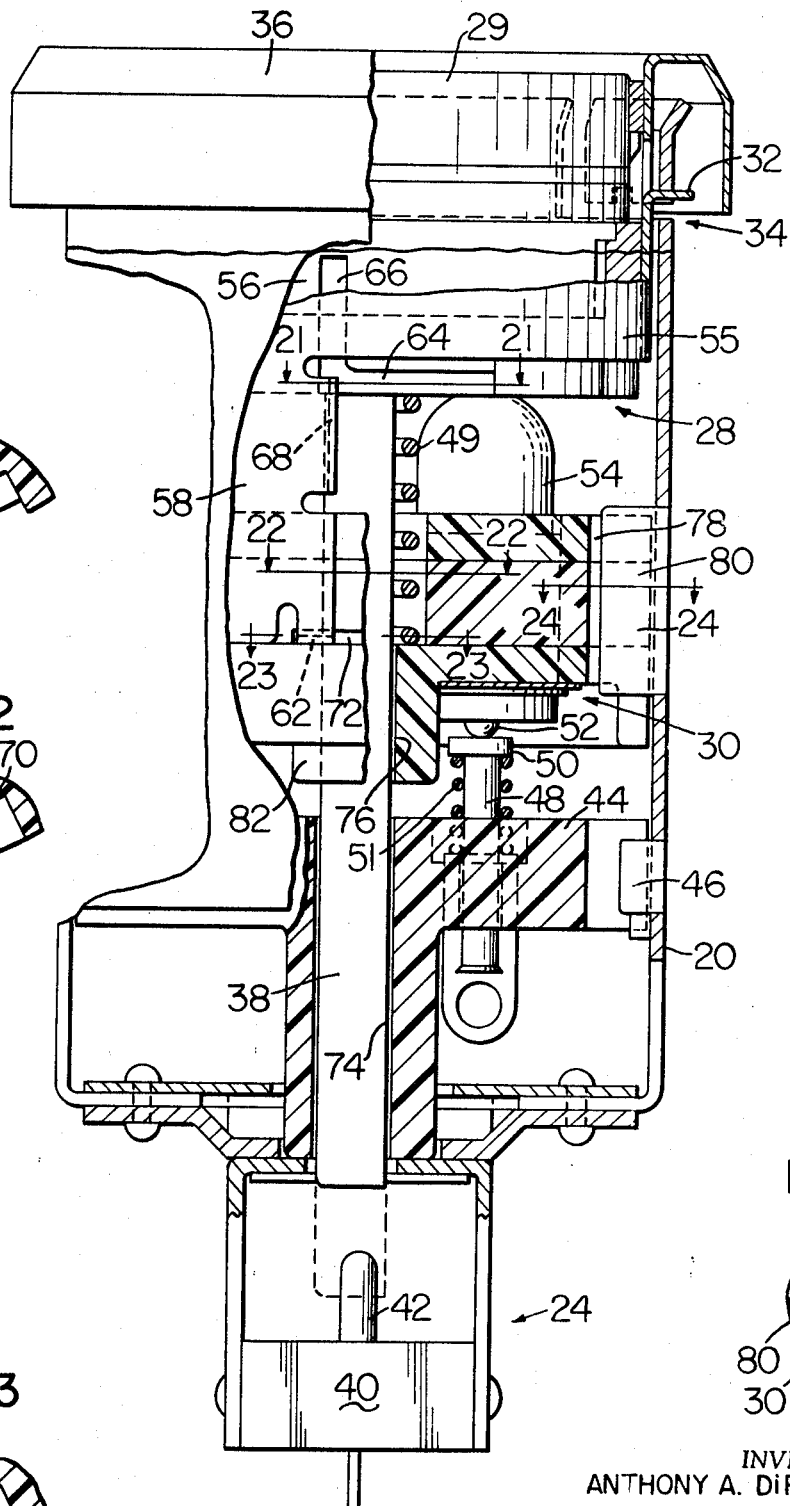

United States Patent Office 3,523,169
Patented Aug. 4, 1970

1

3,523,169
TWO-POSITION TUBULAR LIGHTED
PUSHBUTTON CONSTRUCTION
Anthony A. Di Pilla, Springfield, Pa., assignor to Robertshaw Controls Company, Richmond, Va., a corporation of Delaware
Filed Sept. 4, 1968, Ser. No. 757,239
Int. Cl. H01h 3/20, 9/16
U.S. Cl. 200—167          17 Claims

ABSTRACT OF THE DISCLOSURE

This application discloses a two-position, tubular, lighted pushbutton construction. A tubular casing has a sleeve receiving end and a switch supporting end. A tubular sleeve is insertable in the casing. The sleeve and casing have sleeve positioning means to position the sleeve in a switch locking position and condition or in a switch actuating position and condition by proper turning and releasing movement of the sleeve in the casing. A switch actuator and a lamp holder are unitarily supported by the sleeve and are unitarily insertable into and removable from the casing as a unit. The actuator and lamp holder each has groove or support means cooperating with respective tab or support means on the sleeve to aid in producing said switch locking and switch actuatable conditions.

SUMMARY OF THE INVENTION

This application relates to a two-position, tubular, lighted, pushbutton construction.

One of the features of this invention is to provide a tubular casing means having an insertion end and a switch supporting means. An indexing and locking sleeve means is insertable into the casing through said insertion end. A switch actuator means and a lamp holder means may be unitarily supported by said sleeve means and may be insertable into and removable from said casing means through said insertion end. The sleeve means and casing means may have sleeve positioning means to position said sleeve means in a switch locking position and condition and/or in a switch actuating position and condition. The actuating means and the lamp holder means may each have groove or support means cooperating with respective tab or support means on said sleeve means to aid in producing said switch locking and switch actuatable conditions.

Other features are apparent from this description, from the appended claimed subject matter, and/or from the accompanying drawings in which:

FIG. 1 is a perspective exploded view of a switch construction according to this invention.

FIG. 2 is an exploded view of the switch construction of FIG. 1, in enlarged scale, and with certain parts partly in elevation and partly in cross section.

FIG. 3 is a view of certain parts of FIG. 2 with such parts in a longitudinally separated condition.

FIG. 4 is a perspective view of a portion of FIG. 1 with part of the tongue broken away to expose the parts behind such tongue.

FIG. 5 is a diagrammatic cross section along the line 5—5 of FIG. 2.

FIG. 6 is a diagrammatic cross section along the line 6—6 of FIG. 2.

FIG. 7 is a diagrammatic cross section along the line 7—7 of FIG. 2.

FIG. 8 is a diagrammatic plan view taken along the line 8—8 of FIG. 2.

FIG. 9 is a diagrammatic view of certain parts shown in FIG. 12 shown in longitudinally separated condition.

FIG. 10 is a diagrammatic view similar to FIG. 9 with

2 the parts telescoped and partly relatively rotated to the position shown in FIG. 16.

FIG. 11 is a view similar to FIG. 10 with the parts further rotated to the position shown in FIG. 20.

FIG. 12 is a diagrammatic view in enlarged scale showing the sleeve means, the switch actuator means, and the lamp holder means partly telescoped in the casing means, during insertion into or removal from such casing means.

FIGS. 13, 14 and 15 are cross sections of certain parts of FIG. 12 taken respectively along the lines 13—13, 14—14 and 15—15 of FIG. 12.

FIG. 16 is a view similar to FIG. 12, but showing the parts of such FIG. 12 fully telescoped and partly moved leftward from the position of FIG. 12 to place the switch actuator means in locked switch unactuatable condition.

FIGS. 17, 18 and 19 are cross sections of certain parts of FIG. 16 taken respectively along the lines 17—17, 18—18 and 19—19 of FIG. 16.

FIG. 20 is a view similar to FIG. 16, but showing the parts of such FIG. 16 moved further leftward to place the switch actuator means in switch actuatable condition.

FIGS. 21, 22 and 23 are cross sections of certain parts of FIG. 20 taken respectively along the lines 21—21, 22—22 and 23—23 of FIG. 20.

FIG. 24 is a cross section along the line 24—24 of FIG. 20.

Certain words may be used in this application which indicate direction, relative position and the like. Such words are used for the sake of brevity and clearness, and are used only in connection with the views of the drawings. In actual use, the parts described by such words may have entirely different direction, relative position and the like. Examples of such words are "vertical," "horizontal," "upper," "lower," and the like.

A lighted switch construction according to this invention may include a tubular casing means 20 having an insertion and removal end 22 and having a switch supporting means or end 24.

An indexing and locking sleeve means 26 is insertable into said casing means through said insertion end 22, and likewise removable from said casing means from said end 22. A switch actuator means 28 is unitarily supported by said sleeve means 26, and is insertable into said casing means with said sleeve means 26 through said insertion end 22. A lamp holder means 30 is unitarily supported by said sleeve means 26 and is insertable into said casing means 20 with said sleeve means 26 through said insertion end 22. The actuator means 28 may have a transparent and/or colored actuatable surface means or plate means 29 which may be pushed down when desired. Such plate means 29, may be supported by the outer cylinder 31 and radial arms 33 which are secured to the switch actuating plunger 38 to be elsewhere more fully described. The cylinder 31 and arms 33 form illuminating openings 39 to illuminate the plate means 29.

The sleeve means 26 has a sleeve holding means or sleeve tab means 32. Said sleeve means 26 and tab 32 cooperate with casing holding means 34, or a casing holding slot means 34. The sleeve 26 and tab 32 are insertable in casing 20 while the sleeve 26 is supporting the switch actuator means 28 and lamp holder means 30, as indicated in FIGS. 1 and 2. The tab 32 enters the slot 34, as is imminent in FIG. 9. After insertion of the tab 32 in the slot 34, the sleeve 26 may be turned to place the tab 32 in the slot notch 35, FIG. 10, or turned further to place the tab 32 in the slot notch 37, FIG. 11. If the tab 32 is in notch 35, the switch actuator 28 cannot be pushed down to operate the switch 40. If the tab 32 is in notch 37, then the actuator 28 can be moved down and up to actuate and deactuate the switch 40. That is, said sleeve means 26 may be in a switch locking position, as in FIG. 10 to lock said switch actuator means 28 in such switch unactuatable condition, as shown in FIGS. 10 and 16. Said sleeve means 26 is also movable to switch actuatable position, as in FIGS. 11 and 20, with the tab 32 in notch 37, to render said actuator means 28 in switch operable condition.

The sleeve means 26 is provided with a manipulating cap 36 by which the sleeve means, the switch actuator means 28, and the lamp holder means 30, may be manipulated so that they can be partly inserted into the casing means 20 as a unit, as shown in FIG. 12, then completely inserted, and also partly rotated, or leftwardly turned to the switch locking position of FIGS. 10 and 16, with tab 32 in notch 35, to lock the actuator means 28 in such switch unactuatable condition. The sleeve 26 may be further turned leftwardly, as in FIGS. 11 and 20, to hold said sleeve means in switch actuatable position to render said actuating means 28 in switch operable condition whereby a plunger means 38, of the actuator means 28, is actuatable downwardly to actuate the switch means 40 by means of the switch plunger 42, as shown at the bottom of FIG. 20. Further details of the operation of the actuator means 28, lamp holder means 30, etc., are elsewhere described.

A terminal block means 44 is firmly secured in the casing means 20 against longitudinal and rotating movement by any suitable mounting tongue and slot means 46, and other parts of the casing, as is obvious, so that the connector rods 48, with their caps 50 may electrically contact and resiliently upwardly push the lower end contacts 52, of the lamps 54. Such lamps are frictionally held in the lamp holder means 30 in the usual manner. They are insertable into and removable from such lamp holder means through the bottom surface of such lamp holder means, when the sleeve 26, actuator 28 and lamp holder 30 are removed from casing 20.

Spring action is provided by the compression spring 49 which extends between the lamp holder means 30 and the actuator means 28. Other compression springs 51 extend between the terminal block 44 and the connector rod caps 50. These springs 49 and 51 impart proper spring pressures to produce the spring reactions that become apparent from the drawings and this description.

Such spring action permits the sleeve 26 to be pushed down into the casing 20 with the tab 32 passing down the vertical part 34A of the casing holding means or notch 34 so that the sleeve 26 may then be turned with the tab 32 entering the horizontal part 34B to the switch locking condition and then released so that sleeve tab 32 enters notch 35. Also, the sleeve 26 may be further turned and released so that tab 32 enters notch 37.

The sleeve means 26 may have a circular sleeve portion 55 normally substantially surrounding the upper portion 56 of the actuator means 28.

The sleeve means 26 may also have a tongue means or lamp holder supporting means 58 extending from the sleeve portion 55 and engaging and supporting the lamp holder means 30, so that the sleeve means 26, the actuator means 28, and the lamp holder means 30 are unitarily held together by such tongue means or supporting means 58, as shown in FIGS. 1 and 2.

The lamp holder means 30 may be substantially circular and may have a tongue tab receiving lamp holder groove means 60, with a vertical or longitudinal groove portion 70 and a horizontal or radial portion 72. The tongue or tongue means 58 may have a lower, horizontally flat, lamp holder engaging tongue tab means 62 which engages the groove means 60. When the tab means 62 is in the vertical or longitudinal groove portion 70 of groove means 60, the lamp holder means 30 and sleeve means 26 are longitudinally relatively movable and relatively rotationally locked, and can be partially separated as in FIG. 3. When the tab means 62 is at the intersection or corner of groove portions 70 and 72, as in FIGS. 2 and 12, the sleeve 26 and lamp holder 30 are relatively longitudinally and rotationally free. When the tab 62 is in the horizontal or radial portion 72, the sleeve 26 and lamp holder 30 are horizontally or radially relatively free, and longitudinally or vertically locked.

The switch actuator means 28 may be substantially circular in its upper portion 56, as shown in FIGS. 2 and 6, and may have tongue tab receiving actuator groove means 64 and 66 with the part 64 horizontal, and the part 66 vertical, and with said tongue means 58 having a vertical or upper actuator tongue tab means 68 engaging said actuator groove means 64 to hold said sleeve means 26 and said actuator means 28 longitudinally relatively locked and rotationally relatively free in one condition as shown in FIGS. 12 and 16. When said tab means 68 engages said longitudinal or vertical groove means 66, it holds said sleeve means 26 and said actuator means 28 longitudinally relatively movable and rotationally relatively locked in another condition, as shown in FIG. 20.

The lamp holder 30 is to be inserted with its groove 78 telescoping a vertical flange 80 of casing 20 so that said lamp holder 30 is vertically movable but rotationally fixed. The actuator 28 has a plunger 74 with a flat portion rotationally locked by the flat opening 75 in the lamp holder 30, FIG. 7. The terminal block 44 has a flat opening 77 to receive the flat plunger 38. The plunger 38 is fixed to the actuator 28, so that the actuator 28 is rotationally fixed but vertically movable because of such vertically movable but rotationally fixed plunger 38.

The sleeve means 26 is non-rotatably insertable into the insertion end 22 while the lamp holder tongue tab means 62 is in said longitudinal portion 70 of said groove means 60. Said sleeve means 26 is rotatable to switch locking position after said lamp holder tab means 62 reaches the low position of FIG. 12 and can be rotated to an intermediate part of said radial groove portion 72, with a tab 62 longitudinally locked in horizontal groove 72 and with tab 68 locked in horizontal groove 64, as in FIGS. 16 and 19 to lock said actuator in switch unactuating condition because the actuator 28 is locked against vertical motion while tab 62 is in an intermediate part of groove portion 72 and tab 68 is in an intermediate part of groove 64. The sleeve means 26 can also be locked against rotation by tab 32 in notch 35, as in FIG. 10. Said sleeve means 26 is rotatable to a switch operating position, as in FIGS. 20–23, by pushing sleeve 26 down and rotating it to place tab 32 in notch 37, FIG. 11. Said lamp holder tab means 62 is then at a final or leftward part of said radial groove portion 72, and with said actuator tab means 68 being aligned with the vertical groove portion 66 as in FIGS. 20 and 21. In this position, the actuator 28 can be pushed down and released as often as desired to actuate and unactuate the switch 40 by downward and upward movement of the plungers 38 and 42 as indicated in FIG. 20.

The switch actuator means 28 and the lamp holder means 30 are relatively longitudinally movable with respect to each other but are rotationally fixed with respect to each other. For example, the switch actuator means 28 and the lamp holder means 30 can be relatively close to each other in FIG. 2 but are movable farther apart to the position shown in FIG. 3. The actuator means 28 and the lamp holder means 30 are rotationally fixed with respect to each other because of the flat portion 74, FIG. 7, as the plunger means 38 through the flattened opening 76 in the lamp holder means 30. The plunger means 38 is carried by and is fixed to the actuator means 28, so that the switch actuator means 28 and the lamp holder means 30 are rotationally fixed or locked with respect to each other by such keyed action as is shown in FIG. 7.

The lampholder means 30 has a longitudinally slidable holder locking means or groove 78, FIGS. 20 and 24, to engage longitudinally slidable casing locking means or flange 80 to be engaged together slidably and longitudinally to receive the lamp holder means 30 in the casing means 20 and to rotationally lock the lamp holder means 30 in the casing means 20 against relative rotation, during and after insertion of the lamp holder means in the casing means.

The switch actuator 28 has two extensions 57, FIGS. 2 and 6, which extend outwardly from the upper circular portion 56 of the switch actuator 28. These extensions 57 extend to the external diameter of the circular sleeve portion 55 of the sleeve 26. The circular portions 55 engage the extensions 57. Also, the actuator tab means 68 engages the extensions 57, as shown in FIGS. 2 and 6. This limits the rotational freedom between the sleeve 26 and the actuator 28 in one direction.

The indexing and locking sleeve means 26, the switch actuator means 28, and the lamp holder means 30, before insertion into the casing means 20 are in the longitudinally spring pushed apart condition of FIG. 3 before they are inserted into the casing 20. When they are inserted into the casing 20 said members 26, 28 and 30 will be compressed together to the position of FIG. 2, and may be pushed down into the casing 20 with the groove 78 telescoping with the flange 80, and with the manipulator 36 finally telescoping over the insertion end 22 of the casing. As the parts are pushed in, the parts telescope gradually, passing through the stage shown in FIG. 12 with the lamp holder 30 being pushed downwardly from the position of FIG. 12 to a downward limit of where the lamp holder is stopped by the terminal block means 44 as shown in dotted lines in FIG. 16. At this time the switch actuator means 28 and its plunger 38 cannot be pushed down far enough to engage the switch plunger 42. After having been pushed in as far as possible the manipulator 36 may be turned leftwardly from the position of FIG. 12 to the position of FIG. 16 and with the lamp holder end tab means 62 moved in the groove 60 from the position of FIG. 15 to the position of FIG. 19 and the actuator tongue tab means 68 moved from the position of FIG. 13 to the position of FIG. 17. This places the apparatus in switch inoperative condition, as the plunger 38 cannot actuate the switch actuator 42, as the downward limit of the plunger 38 is shown in dotted lines in FIG. 16, well above the switch actuating plunger 42.

The sleeve 26 may be pushed downwardly to release tab 32 from notch 35 of the casing 20. Then sleeve 26 and tab 32 can be released to move into notch 37 with the parts as shown in FIGS. 20–23. The sleeve tongue 58 is moved so that lamp holder tab 62 is still in the horizontal groove 72 to hold the sleeve 26 and lamp holder longitudinally fixed. At the same time the tongue tab 68 is aligned with vertical groove 66 so that the actuator 28 can be pushed down and released upwardly as often as desired to actuate and unactuate the switch 40 by operation of the switch plunger 42 by the actuator plunger 38.

The sleeve 26, actuator 28 and lamp holder 30 may be removed from the casing 20 by pushing down on the manipulator 36 to release the tab 32, FIG. 11, from notch 37. Then the manipulator 36 and sleeve 26 may be rotated rightwardly to the position of FIG. 12, at which time the manipulator 36, sleeve 26, actuator 28 and lamp holder 30 may be pulled out of the casing to the positions of FIGS. 1 and 2 and with the lamp holder 30 partly separated from the actuator to the position of FIG. 3. At that time lamps may be replaced and other changes made as desired. Thereafter the parts may be telescoped and reassembled as previously described.

A new, useful and unobvious two position, tubular, lighted, push button construction has been provided.

While the form of the invention now preferred has been disclosed as required by the statute, other forms may be used, all coming within the scope of the appended claimed subject matter.

What is claimed is:

1. In combination:
    an outer tubular casing means having an insertion end and having switch supporting means;
    an indexing and locking sleeve means insertable into said casing means through said insertion end;
    a switch actuator means unitarily supported by said sleeve means and insertable into said casing means with said sleeve means through said insertion end;
    a lamp holder means unitarily supported by said sleeve means and insertable into said casing means with said sleeve means through said insertion end; and
    sleeve holding means on said sleeve means and casing holding means on said casing means holding said sleeve means in a switch locking position to lock said switch actuator means in switch unactuatable condition and movable to hold said sleeve means in switch actuatable position to render said actuator means in switch operable condition.

2. A combination according to claim 1 having a terminal block means supported by said casing means below said lamp holder means.

3. A combination according to claim 1 with said sleeve means having a circular sleeve portion substantially surrounding an upper portion of said switch actuator means.

4. A combination according to claim 3 with said sleeve means having a tongue means extending from said circular sleeve portion and engaging said lamp holder means.

5. A combination according to claim 4 with said lamp holder means being substantially circular and having tongue tab receiving lamp holder groove means, and with said tongue having lamp holder tongue tab means engaging said lamp holder groove means to hold said sleeve means and said lamp holder means longitudinally relatively movable and relatively rotationally locked in a first condition and to hold said sleeve means and said lamp holder means relatively rotationally free and relatively longitudinally locked in a second condition.

6. A combination according to claim 5 with said actuator means being substantially circular in its upper portion and having tongue tab receiving actuator groove means, and with said tongue means having actuator tongue tab means engaging said actuator groove means to hold said sleeve means and said actuator means longitudinally and rotationally relatively locked in said first condition and to hold said sleeve means and actuator means longitudinally relatively movable and rotationally relatively locked in said second condition.

7. A combination according to claim 4 with said lamp holder means being substantially circular and having tongue tab receiving lamp holder groove means with a longitudinal lamp holder groove portion and with a radial lamp holder groove portion, and with said tongue having lamp holder tongue tab means engaging said lamp holder groove means, and with said actuator means being substantially circular in its upper portion and having tongue tab receiving actuator groove means with a radial groove portion and a longitudinal groove portion, and with said tongue having actuator tongue tab means engaging said actuator groove means.

8. A combination according to claim 7 with said sleeve means being insertable into said insertion end while said lamp holder tongue tab means is in said longitudinal portion, and with said sleeve means being rotatable to a switch locking position with said lamp holder tab means in an intermediate part of said radial groove portion, and with said sleeve means being rotatable to a switch operating position with said lamp holder tab means at a final part of said radial groove portion, and with said actuator tab means being at an intermediate groove portion during said switch locking position and being at said longitudinal groove portion at said switch operation position.

9. A combination according to claim 1 in which said switch actuator means and said lamp holder means are relatively longitudinally movable with respect to each other but are rotationally fixed with respect to each other.

10. A combination according to claim 1 in which said switch actuator means has a switch actuating plunger passing through said lamp holder means, which plunger is relatively longitudinally movable in said lamp holder means but is rotationally locked in said lamp holder means.

11. A combination according to claim 1 in which said lamp holder means has longitudinally slidable holder locking means to engage longitudinally slidable casing locking means to be engaged together slidably and longitudinally to receive said lamp holder means in said casing means and to rotationally lock said lamp holder means in said casing means against relative rotation.

12. A combination according to claim 11 in which said longitudinal slidable holder locking means is a longitudinal slot in said lamp holder means, and said longitudinal slidable casing locking means is a longitudinal flange on said casing means to engage said longitudinal slot.

13. In combination:
an outer tubular casing means having an insertion end and a switch supporting end;
a lamp holder means and switch actuator means insertable into said casing through said insertion end;
unitary holding means holding said switch actuator means and said lamp holder means in unitary and relatively movable relationship;
said unitary holding means longitudinally insertable into said casing to a switch actuator locking position locking said switch actuator means in switch inoperative condition and in a switch actuatable position to render said switch actuator member operative to operate said switch.

14. A combination according to claim 13 in which said unitary holding means includes a tubular sleeve means surrounding and supporting said actuator.

15. A combination according to claim 14 in which said sleeve has tongue means extending to and supporting said lamp holder means.

16. A combination according to claim 14 in which said sleeve has a sleeve locking tab means engageable with said casing to lock said switch actuator means in switch inoperative condition and to render said switch actuator means in switch operative condition.

17. A combination according to claim 16 in which said sleeve is longitudinally insertable into said casing and is laterally rotatable to one position to lock said switch actuator means in switch inoperative condition and rotatable to another position to render said actuator operative to operate said switch.

References Cited

UNITED STATES PATENTS

| | | |
|---|---|---|
| 2,523,125 | 9/1950 | Ley. |
| 3,157,771 | 11/1964 | Roeser. |
| 3,197,598 | 7/1965 | Andersen et al. |
| 3,249,705 | 5/1966 | Amis et al. |
| 3,268,889 | 8/1966 | Ast. |

FOREIGN PATENTS

| | | |
|---|---|---|
| 1,150,432 | 6/1963 | Germany. |

HERMAN O. JONES, Primary Examiner

U.S. Cl. X.R.

200—169